(12) United States Patent
Yokoyama

(10) Patent No.: US 6,834,321 B2
(45) Date of Patent: Dec. 21, 2004

(54) COMMUNICATION METHOD OF A SERIALLY CONNECTED ELECTRONIC APPARATUS

(75) Inventor: Toshihiko Yokoyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 621 days.

(21) Appl. No.: 09/907,673

(22) Filed: Jul. 19, 2001

(65) Prior Publication Data

US 2002/0016875 A1 Feb. 7, 2002

(30) Foreign Application Priority Data

Jul. 24, 2000 (JP) ........................................ 2000-222193

(51) Int. Cl.[7] .......................... G06F 13/00; G06F 13/14; G06F 3/00
(52) U.S. Cl. ........................ 710/316; 710/300; 710/305; 710/38; 710/2; 710/3; 710/9; 710/104; 713/1
(58) Field of Search ............................. 710/1–3, 8–19, 710/38, 100, 300, 104, 305, 316; 713/1

(56) References Cited

U.S. PATENT DOCUMENTS

| | | | | |
|---|---|---|---|---|
| 4,443,866 A | * | 4/1984 | Burgiss, Sr. ................ 710/100 |
| 5,423,053 A | * | 6/1995 | Cahen ......................... 710/107 |
| 5,765,040 A | * | 6/1998 | Uno et al. ..................... 710/46 |
| 5,835,790 A | * | 11/1998 | Nagai et al. .................. 710/61 |
| 5,862,405 A | * | 1/1999 | Fukuda et al. ................. 710/9 |
| 5,933,656 A | * | 8/1999 | Hansen ......................... 710/62 |
| 6,009,491 A | * | 12/1999 | Roppel et al. .............. 710/305 |
| 6,105,077 A | * | 8/2000 | Kimura .......................... 710/9 |
| 6,272,529 B1 | * | 8/2001 | Lum .......................... 709/203 |

FOREIGN PATENT DOCUMENTS

| | | |
|---|---|---|
| DE | 195 13 747 | 10/1996 |
| DE | 197 40 306 | 3/1999 |
| EP | 0 965 965 | 12/1999 |
| WO | WO 99/14643 | 3/1999 |

* cited by examiner

*Primary Examiner*—Sumati Lefkowitz
(74) *Attorney, Agent, or Firm*—Fitzpatrick, Cella, Harper & Scinto

(57) ABSTRACT

Controlling each of a plurality of serially connected electronic apparatuses without increasing the number of signal lines is provided. In an electronic apparatus, from among a plurality of electronic apparatuses serially connected to a computer, a control command signal and first and second control signals can be transmitted/received, and the transmission/reception of the control command signal is integrally controlled. The electronic apparatus provides the first control signal. The provided first control signal is output to an electronic apparatus to be connected at an immediately preceding stage of connection via a second input/output unit to be connected to that electronic apparatus. It is then determined whether or not the second control signal has been input in response to the output of the first control signal. When it has been determined that the second control signal has not been input, the computer is notified that the concerned electronic apparatus is at a last stage of connection via a first input/output unit to be connected to an electronic apparatus provided at an immediately preceding stage of connection.

7 Claims, 9 Drawing Sheets

FIG.2

CONFIGURATION OF CONTROL COMMAND

| HEADER | ID NUMBER OF TRANSMISSION DESTINATION'S APPARATUS | COMMANDS | PARAMETERS | TERMINATOR |
|---|---|---|---|---|

CONFIGURATION OF Ack (RESPONSE COMMAND)

| HEADER | ID NUMBER OF TRANSMITTER'S APPARATUS | ID NUMBER OF TRANSMISSION DESTINATION'S APPARATUS | STATUS | TERMINATOR |
|---|---|---|---|---|

COMMUNICATION METHOD OF A SERIALLY CONNECTED ELECTRONIC APPARATUS

BACKGROUND OF THE INVENTION

1. Field of the Invention

The present invention relates to a communication method of an electronic apparatus in which communication is performed by integrally controlling a plurality of apparatuses, such as cameras or the like.

2. Description of the Related Art

A technique of controlling electronic apparatuses, such as cameras or the like, from a personal computer (PC) using standards, such as RS-232C or the like, has been known. When using the RS-232C standards, it is impossible to control a plurality of electronic apparatuses unless a plurality of connectors are provided at a PC. In order to solve such a problem, there is a conventional method of performing communication by serially connecting a plurality of electronic apparatuses. However, in this conventional method of performing communication by serially connecting electronic apparatuses, it is necessary to provide at each of the electronic apparatuses a terminal for determining whether or not other electronic apparatuses are connected at the following stage, in addition to signal lines for transmitting/receiving control signals for the electronic apparatus.

SUMMARY OF THE INVENTION

It is an object of the present invention to provide a method for controlling an electronic apparatus in which a plurality of electronic apparatuses can be controlled while serially connecting them, without increasing the number of signal lines.

According to one aspect, the present invention is an electronic apparatus, among a plurality of serially connected electronic apparatuses, which can communicate a control command signal and first and second control signals. The electronic apparatus includes a first connection unit, having an input terminal for inputting the first control signal and an output terminal for outputting the second control signal, which is connected to an electronic apparatus provided at an immediately preceding stage of connection. A second connection unit has an output terminal for outputting the first control signal and an input terminal for inputting the second control signal, which is connected to an electronic apparatus provided at an immediately succeeding stage of connection. A processing unit has a first input terminal connected to the input terminal of the first connection unit, a second input terminal connected to the input terminal of the second connection unit, and a change-over switch for switching connection of the output terminal of the first connection unit to one of the output terminal of the processing unit and the input terminal of the second connection unit. The processing unit provides the first control signal, outputs the provided first control signal from the output terminal, determines whether or not the second control signal has been input from the second input terminal in response to the output of the first control signal, and controls the change-over switch in accordance with the determination.

According to another aspect, the present invention is an electronic apparatus, among a plurality of electronic apparatuses serially connected to a computer, which can communicate a control command signal and first and second control signals. The electronic apparatus includes a first communication unit for communicating the control command signal and the first and second control signals with an electronic apparatus provided at an immediately preceding stage of connection, a second communication unit for communicating the control command signal and the first and second control signals with an electronic apparatus provided at an immediately succeeding stage of connection. A processing unit provides the first control signal, outputs the provided first control signal to an electronic apparatus to be connected at an immediately succeeding stage of connection via the second communication unit, determines whether or not the second control signal has been input in response to the output of the first control signal, and notifies, when it has been determined that the second control signal has not been input, the computer of the fact that the concerned electronic apparatus is connected at a last stage of connection via the first communication unit.

According to still another aspect, the present invention is a computer terminal which serially connects a plurality of electronic apparatuses and which can integrally control the plurality of electronic apparatuses by communicating a control command signal and a predetermined control signal with each of the plurality of electronic apparatuses. The computer terminal includes a communication unit for communicating the control command signal and the predetermined control signal with each of the plurality of electronic apparatuses, and a processing unit for outputting the predetermined control signal to which an ID address of a computer is added, detecting whether or not a response command corresponding to the output predetermined control signal has been input, recognizing, when it has been detected that the response command has been input, a connection state of the concerned electronic apparatus based on the input response command, and providing the concerned electronic apparatus with a control command based on the recognition.

According to yet another aspect, the present invention is a communication method of an electronic apparatus, from among a plurality of electronic apparatuses serially connected to a computer, which can communicate a control command signal and first and second control signals. The method includes the steps of newly providing the first control signal in accordance with input of the first control signal output from the computer or an electronic apparatus provided at an immediately preceding stage of connection, outputting the provided first control signal to an electronic apparatus to be connected at an immediately succeeding stage of connection, determining whether or not the second control signal has been input in response to the first control signal output to the electronic apparatus to be connected to the immediately succeeding stage of connection, and notifying, when the second control signal has not been input, the computer of the fact that the concerned electronic apparatus is at a last stage of connection.

According to yet a further aspect, the present invention is an operation process of a computer terminal which serially connects a plurality of electronic apparatuses and which can integrally control the plurality of electronic apparatuses by communicating a control command signal and a predetermined control signal with each of the plurality of electronic apparatuses. The process includes a communication step of communicating the control command signal and the predetermined control signal with each of the plurality of electronic apparatuses, and a processing step of outputting the predetermined control signal to which an ID address of a computer is added, detecting whether or not a response command corresponding to the output predetermined control signal has been input, recognizing, when it has been detected that the response command has been input, a connection state of a concerned electronic apparatus based on the input response command, and providing the concerned electronic apparatus with a control command based on the recognition.

According to still another aspect, the present invention is a storage medium storing communication modules of an electronic apparatus, from among a plurality of electronic apparatuses serially connected to a computer, which can communicate a control command signal and first and second control signals. The modules include a module of newly providing the first control signal in accordance with input of the first control signal output from the computer or an electronic apparatus provided at an immediately preceding stage of connection, a module of outputting the provided first control signal to an electronic apparatus to be connected at an immediately succeeding stage of connection, a module of determining whether or not the second control signal has been input in response to the first control signal output to the electronic apparatus to be connected at the immediately succeeding stage of connection, and a module of notifying, when the second control signal has not been input, the computer of the fact that the electronic apparatus is at a last stage of connection.

The foregoing and other objects, advantages and features of the present invention will become more apparent from the following description of the preferred embodiment taken in conjunction with the accompanying drawings.

BRIEF DESCRIPTION OF THE DRAWINGS

FIG. 2 illustrates examples of commands to be transmitted and received between the electronic apparatuses in the embodiment;

DESCRIPTION OF THE PREFERRED EMBODIMENT

A preferred embodiment of the present invention will now be described with reference to the drawings.

Figure 1:
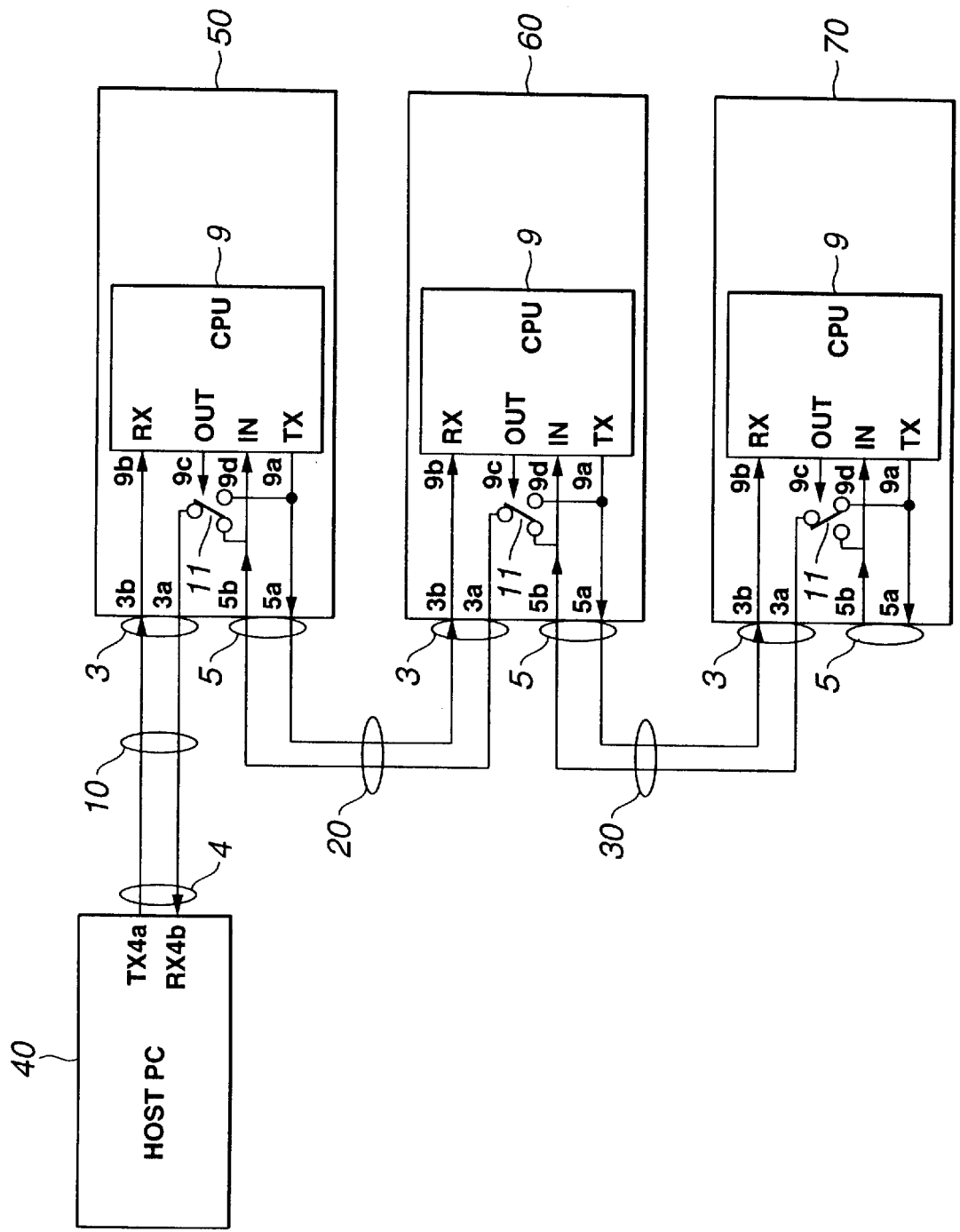
FIG. 1 is a diagram illustrating the configuration of connection of electronic apparatuses according to an embodiment of the present invention.

FIG. 1 is a diagram illustrating a system for controlling serially connected electronic apparatuses via RS-232C ports from a host PC 40. In this embodiment, a case of using cameras, whose pan and tilt can be controlled, as the electronic apparatuses will be described.

In FIG. 1, pan and tilt of each of cameras 50, 60 and 70 can be controlled. The host PC 40 comprises, for example, a personal computer, and outputs a control command and a cascade connection command (to be described below) to the directly connected camera 50. A cable 10 is for exchanging commands between the host PC 40 and the camera 50. A cable 20 is for exchanging commands between the camera 50 and the camera 60. A cable 30 is for exchanging commands between the camera 60 and the camera 70.

Each of the cameras 50, 60 and 70 has a first input/output terminal 3 and a second input/output terminal 5, each for inputting and outputting a control command and a cascade control command. The first input/output terminal 3 has an output port 3a and an input port 3b. The second input/output port 5 has an output port 5a and an input port 5b. Each of the cameras 50, 60 and 70 also has a CPU (central processing unit) 9 including a buffer memory (not shown). The CPU 9 has ports (terminals) 9a–9d for exchanging commands with the first input/output terminal 3 and the second input/output terminal 5. Each of the cameras 50, 60 and 70 further has a switch 11 for performing switching based on a signal from the port 9c.

The host PC 40 has an input/output terminal 4 for inputting and outputting a control command and a cascade connection command. The input/output terminal 4 has an output port 4a and an input port 4b.

Figure 8:
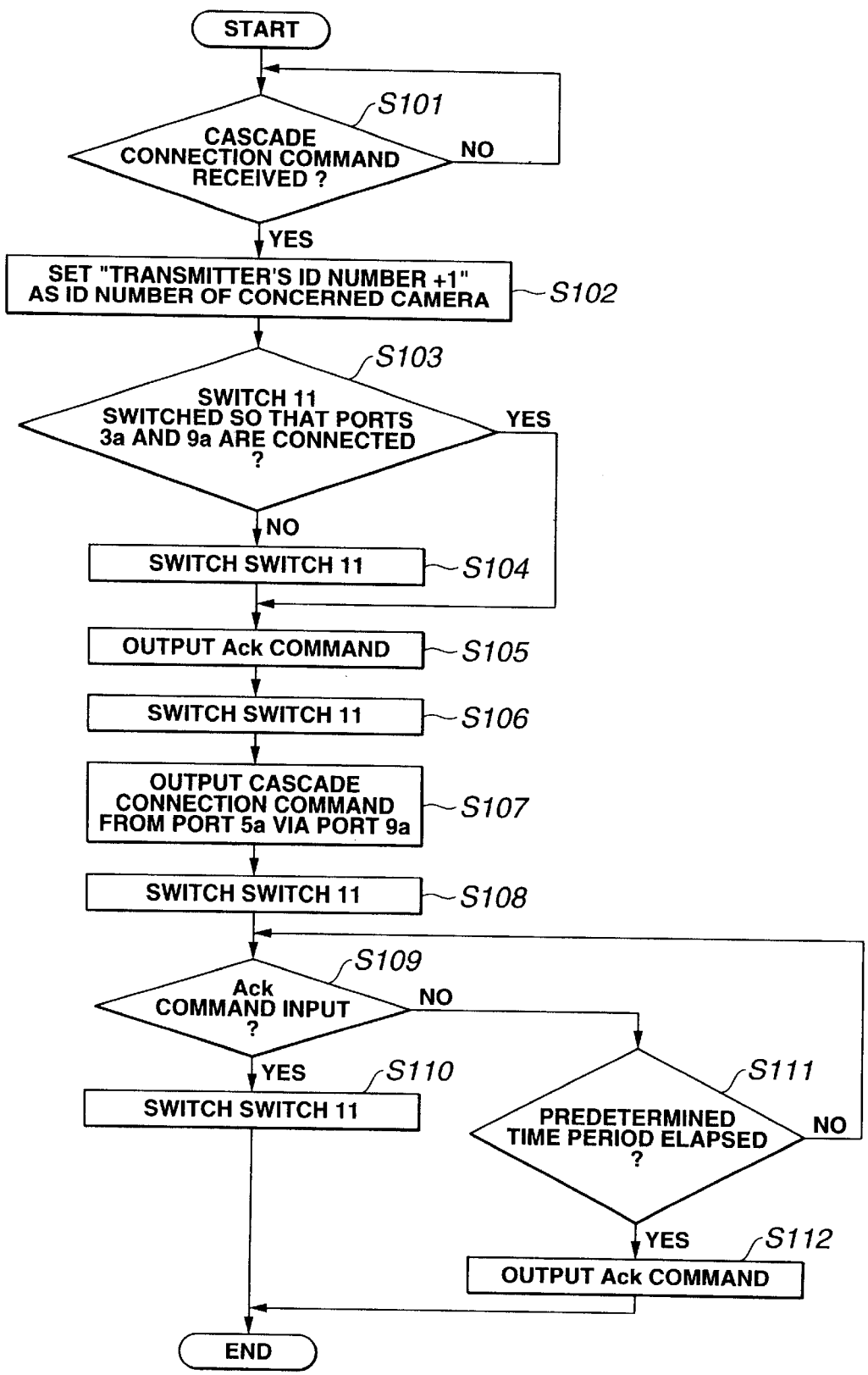
FIG. 8 is a flowchart illustrating an operation process in an electronic apparatus in the embodiment.

FIG. 8 is a flowchart illustrating an operation process of the CPU 9 when a cascade connection command for recognizing a connection state of each of the cameras serially connected via the RS-232C ports by the host PC 40 has been input in the concerned camera (any of the cameras 50, 60 and 70). The cascade connection command is for causing the connected camera to set an ID and to recognize the set camera ID by the host PC 40.

In step S101, it is determined whether or not a cascade connection command has been received via the ports 3b and 9b. If the result of the determination in step S101 is affirmative, the process proceeds to step S102.

In step S102, the received cascade connection command is confirmed, and "the ID number of the transmitter's apparatus (a camera or the host PC 40)+1" is set as the ID number of the concerned camera, and is stored in the buffer memory.

In step S103, it is determined whether or not the switch 11 is switched so that the ports 3a and 9a are connected. If the result of the determination in step S103 is affirmative, the process proceeds to step S105. If the result of the determination in step S103 is negative, the process proceeds to step S104, where the switch 11 is switched to connect the ports 3a and 9a by outputting a control signal from the port 9c.

Then, in step S105, an Ack command is output from the port 3a to the apparatus of the transmitter of the cascade connection command via the port 9a. As shown in FIG. 2, the Ack command is configured in the form of a packet including a header, the ID number of the transmitter's apparatus, the ID number of the transmission destination's apparatus, status information, serving as information relating to the transmitter's apparatus, and a terminator.

After outputting the Ack command, then, in step S106, by outputting a control signal from the port 9c, switch 11 is switched to connect the ports 3a and 5b. Then, in step S107, a cascade connection command consisting of transmitter's apparatus ID number "xx" cascade "ON" is output from the output port 5a via the port 9a. Then, the process proceeds to step S108, where the switch 11 is switched by outputting a control signal from the port 9c after outputting the cascade connection command, to connect the output port 3a and the port 9a.

Then, in step S109, it is determined whether or not an Ack command including the transmitter's apparatus ID number equal to the concerned camera's ID number +1 has been input from the port 9d via the port 5b. If the result of the determination in step S109 is affirmative, the process proceeds to step S110, where the switch 11 is switched by outputting a control signal from the port 9c to connect the output port 3a and the input port 5b, and the process is then terminated. If the result of the determination in step S109 is negative, the process proceeds to step S111, where it is determined whether or not a predetermined time period has elapsed. If the result of the determination in step S111 is negative, the process returns to step S109, where input of an Ack command is awaited. When an Ack command is not input even after the lapse of the predetermined time period, then, it is determined that the concerned camera is at the last stage of connection, and the process proceeds to step S112. In step S112, information indicating that the concerned camera is at the last stage of connection is added to status information, and an Ack signal is output to the host PC 40.

Figure 9:
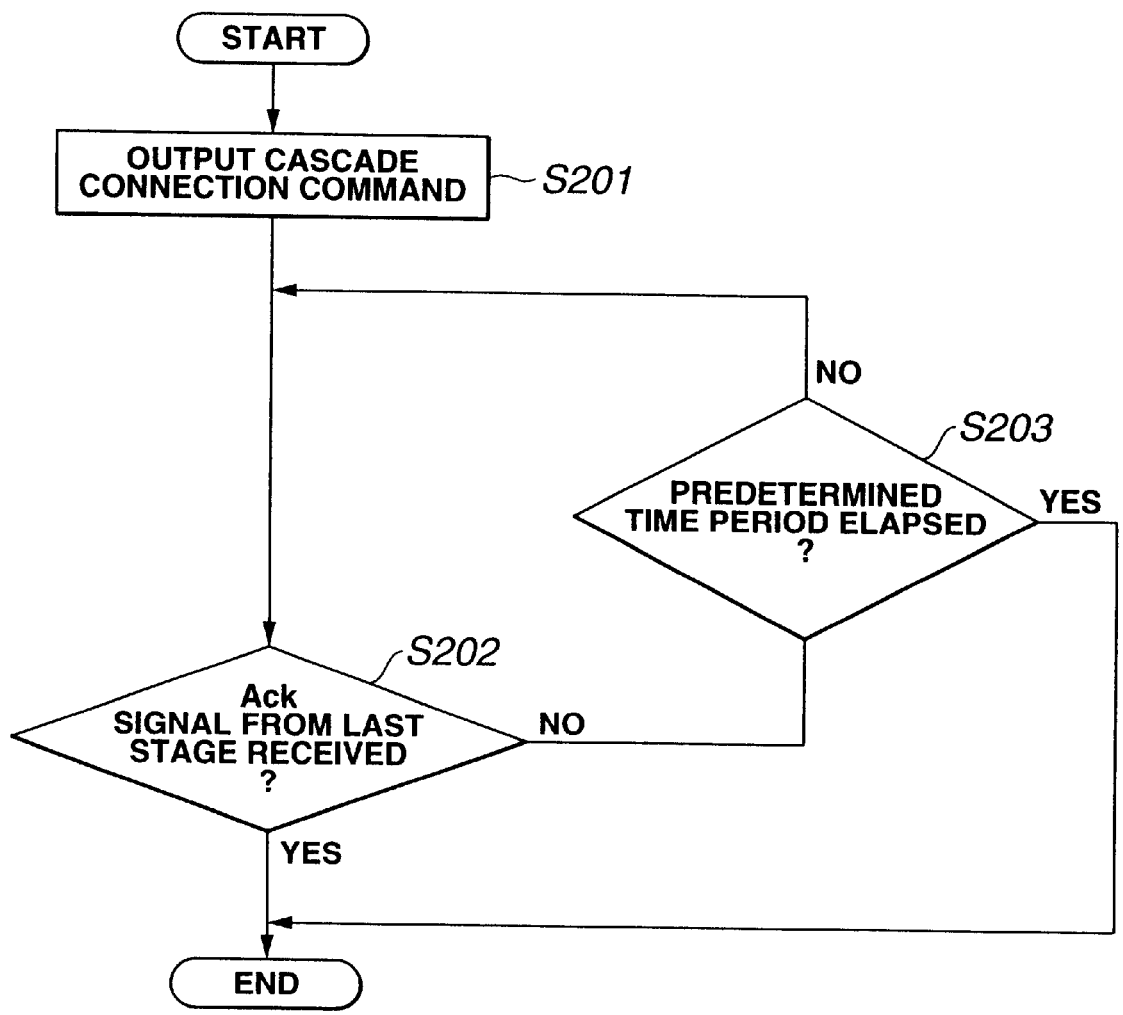
FIG. 9 is a flowchart illustrating an operation process in a host PC in the embodiment.

FIG. 9 is a flowchart illustrating the operation process of the host PC 40 when outputting a cascade connection command for recognizing the state of connection of a camera by the host PC 40.

First, in step S201, a cascade connection command consisting of transmitter's apparatus ID number "00" cascade "ON" is output. Then, the process proceeds to step S202, where it is determined whether or not an Ack signal from the camera at the last stage of connection has been received. If the result of the determination in step S202 is affirmative, the ID number and status information of the concerned camera are acquired, and the process is then terminated. If the result of the determination in step S202 is negative, the process proceeds to step S203, where it is determined whether or not a predetermined time period has elapsed after outputting the cascade connection command. If the result of the determination in step S203 is negative, the process returns to step S202. If the result of the determination in step S203 is affirmative, the host PC 40 outputs an error message, and the process is then terminated.

By outputting a cascade connection command in the above-described manner when controlling a camera, the host PC 40 can know the state of connection of the camera. Furthermore, since it is possible to appropriately switch connection of internal terminals of each camera in advance, the number of signal lines connecting the cameras can be minimized.

The operation process when a cascade connection signal is output from the host PC 40 in the configuration of connection of electronic apparatuses shown in FIG. 1 will now be described in more detail with reference to FIGS. 3–5.

Figure 3:
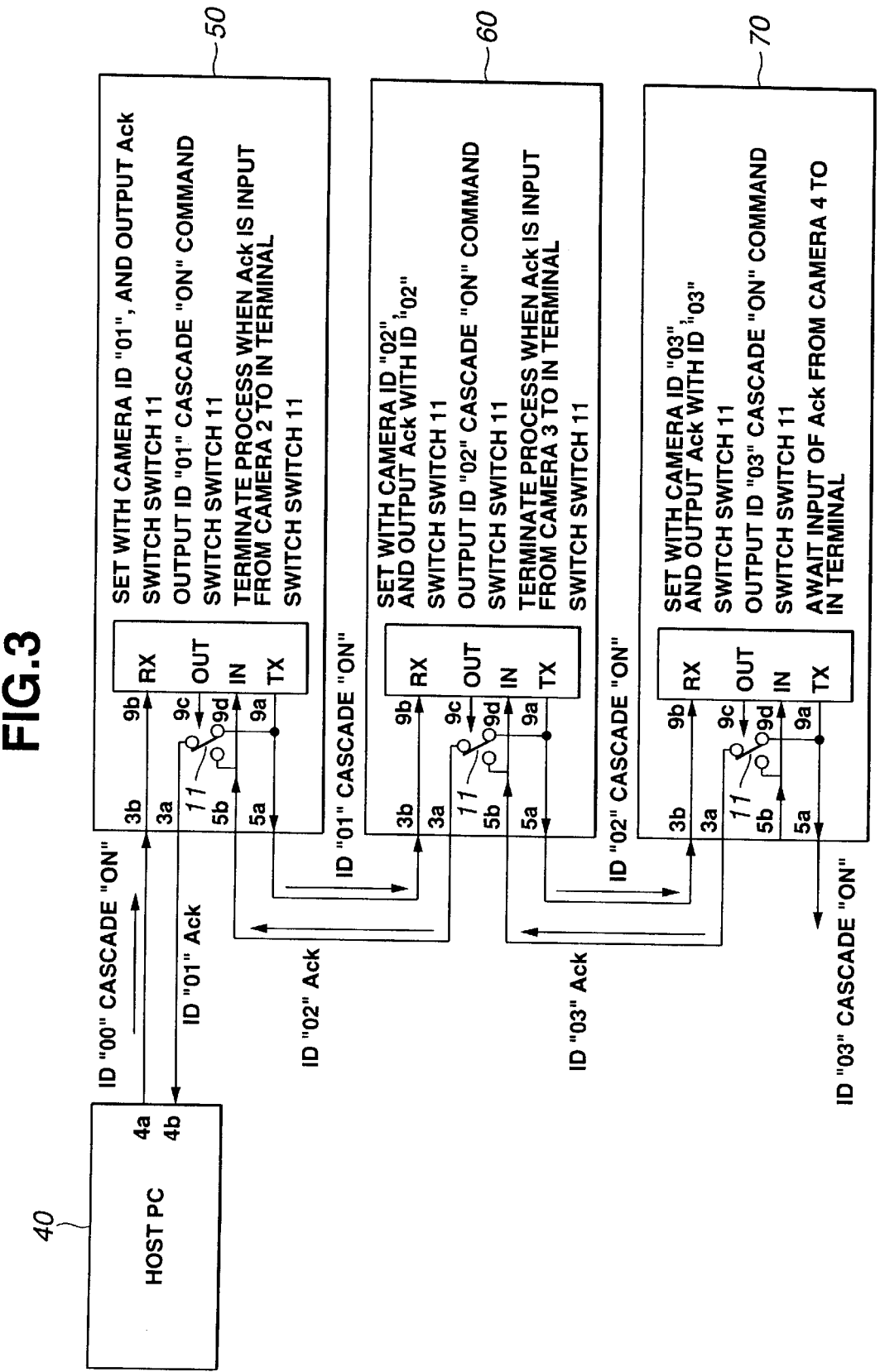
FIGS. 3 and 4 are diagrams, each illustrating a control method in the configuration of connection of the electronic apparatuses in the embodiment.

First, in the state shown in FIG. 3, an initialization process is performed when the power supply of each of the cameras 50, 60 and 70 is turned on, whereby the ID number of each of the cameras 50, 60 and 70 is cleared, and the switch 11 is switched so as to connect the output port 3a and the port 9a in advance. Then, a cascade connection command consisting of the transmitter's apparatus ID number "00" cascade "ON" is output from the output port 4a of the host PC 40 to the directly connected camera 50.

Figure 5:
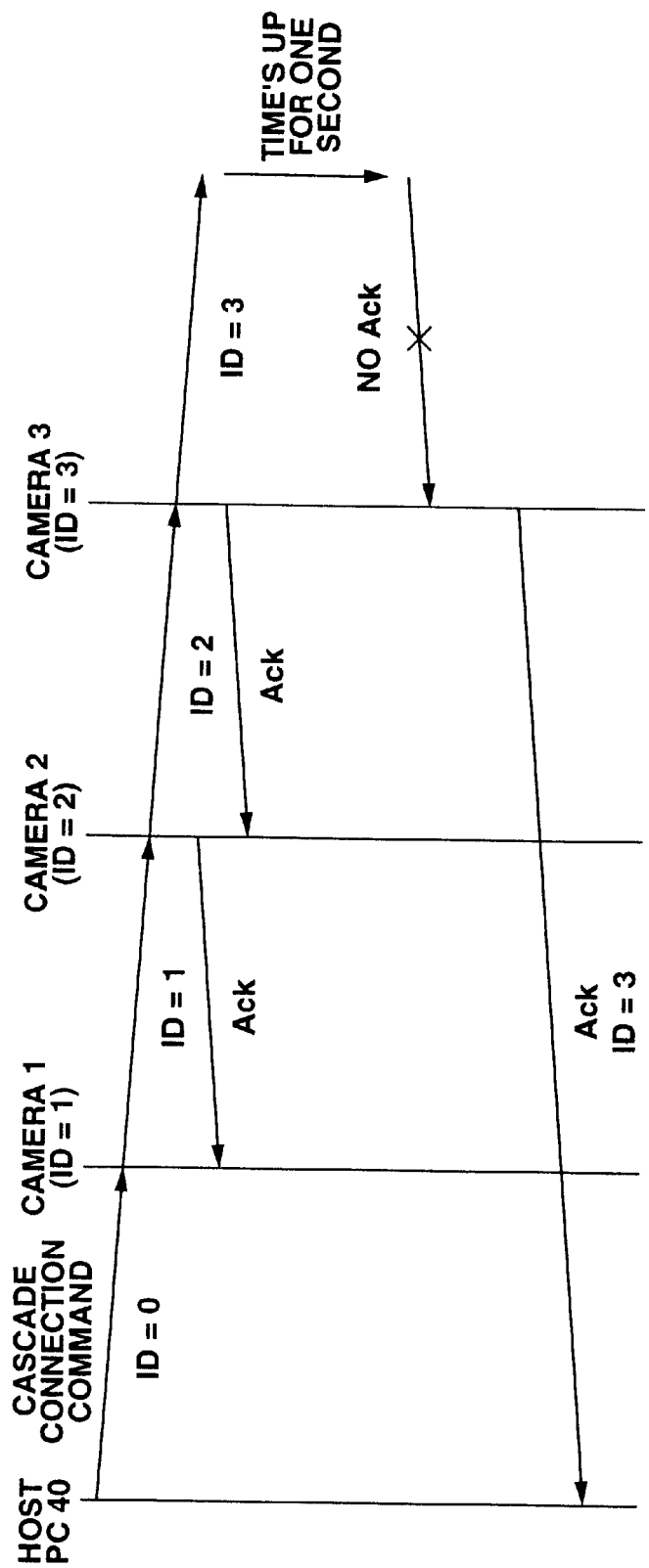
FIG. 5 is a diagram illustrating an example of transmission and reception of a cascade connection command in the configuration of connection of the electronic apparatuses in the embodiment.

In the camera 50, when the above-described cascade connection command has been input, the ID number of the camera 50 is set to 0+1=1, i.e., to "01", and is stored in the buffer memory (In FIGS. 3 and 5, the camera 50 is directly connected to the host PC 40, and although an Ack command is not output to the host PC 40 because the camera 50 is not at the last stage of connection, an Ack command may be output to the host PC 40 by adding the set ID number). By outputting a control command from the output port 9c after outputting the Ack command, the output ports 3a and 5a are connected by switching the switch 11. Then, a cascade connection command consisting of the transmitter's ID number "01" cascade "ON" is output from the output port 5a to the camera 60 via the port 9a. Then, by outputting a control signal from the output port 9c to the camera 60, the output port 3a and the port 9a are connected by switching the switch 11. When an Ack command is thereafter input from the camera 60, the operation process in the camera 50 is terminated.

Then, in the camera 60, when the cascade connection command output from the camera 50 has been input, the ID number of the camera 60 is set to 1+1=2, i.e., to "02", and is stored in the buffer memory. Then, an Ack command is output to the camera 60 by adding the set ID number. By outputting a control command from the output port 9c after outputting the Ack command, the output ports 3a and 5a are connected by switching the switch 11. Then, a cascade connection command consisting of the transmitter's ID number "02" cascade "ON" is output from the output port 5a to the camera 70 via the port 9a. Then, by outputting a control signal from the output port 9c, the output port 3a and the port 9a are connected by switching the switch 11. When an Ack command is thereafter input from the camera 70, the operation process in the camera 60 is terminated.

Then, in the camera 70, when the cascade connection command output from the camera 60 has been input, the ID number of the camera 70 is set to 2+1=3, i.e., to "03", and is stored in the buffer memory. Then, an Ack command is output to the camera 60 by adding the set ID number. By outputting a control command from the output port 9c after outputting the Ack command, the output ports 3a and 5a are connected by switching the switch 11. Then, a cascade connection command consisting of the transmitter's ID number "03" cascade "ON" is output from the output port 5a via the port 9a. As shown in FIG. 4, since the camera 70 is at the last stage of connection, an Ack command is, of course, not input. After the lapse of a predetermined time period (for example, 1 second), the camera 70 confirms that an Ack command has not been input, and outputs an Ack signal to the host PC 40 by adding information that the camera 70 is at the last stage of connection to status information. The host PC 40 receives an Ack signal consisting of ID "03" output from the camera 70 within a maximum of 5 seconds after transmitting a cascade connection command, and therefore knows that three cameras are connected.

After knowing the number of cameras connected to the host PC 40 in the above-described manner, the host PC 40 can execute control of the connected cameras according to processing to be described below. Although in the foregoing description, a cascade connection command is output when starting the connection system, a cascade connection command may be periodically output from the host PC 40. According to such processing, the current connection state can be exactly known even if the state of connection of the cameras has changed.

Figure 6:
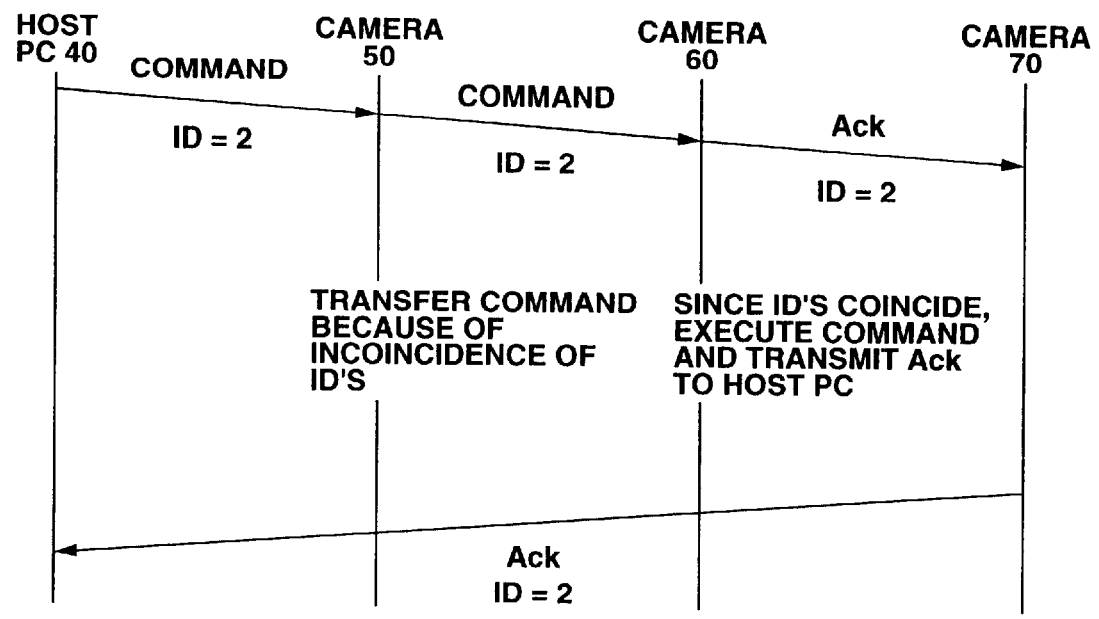
FIGS. 6 and 7 are diagrams, each illustrating an example of transmission and reception of a control command in the configuration of connection of the electronic apparatuses in the embodiment.

A description will now be provided with reference to FIG. 6 of the operation process when outputting a control command for the connected camera after the host PC 40 has recognized the state of connection of cameras by outputting a cascade connection command. FIG. 6 illustrates the operation process when the host PC 40 has transmitted a control command to the camera 60.

Figure 4:
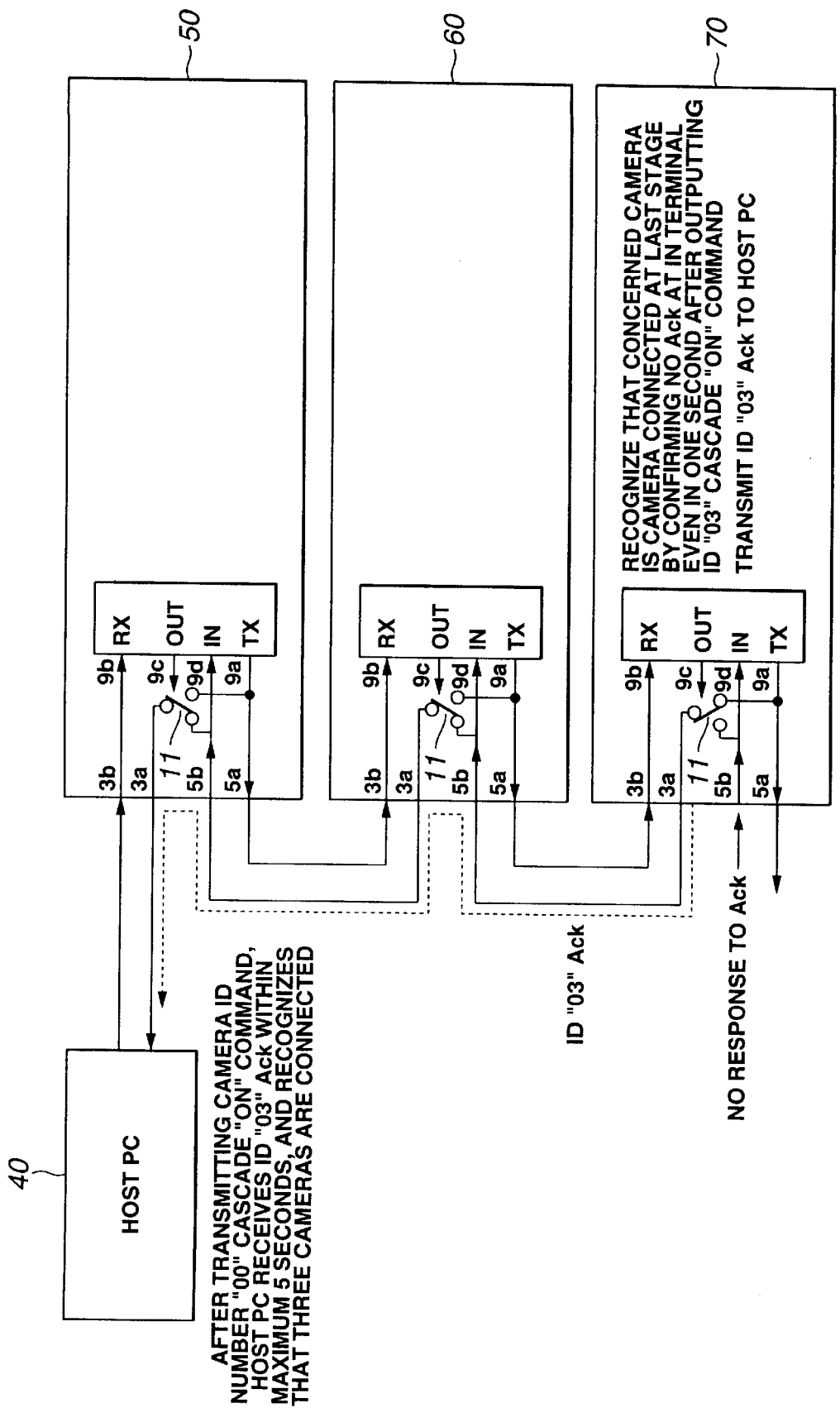

When outputting a control command from the host PC 40 to the connected camera, since a cascade connection command has already been output, the switch 11 of each camera has already been switched as shown in FIG. 4 so as to be able to deal with a case in which a control command is input. That is, the switch 11 is switched so as to connect the output port 3a and the port 9a of only the camera 70 at the last stage of connection, and the switch is switched so as to connect the output port 3a and the input port 5b in the cameras 50 and 60 to each of which apparatuses are preset at the immediately preceding stage and at the immediately succeeding stage of connection.

First, a control command is output from the host PC 40 to the camera 50. As shown in FIG. 2, the control command has the configuration of a packet including a header, the ID number of the transmission destination's apparatus (in the case of FIG. 6, "02" since the control command is for the camera 60), commands (such as pan and tilt commands), parameters (the amounts of driving for the commands), and a terminator.

In the camera 50, when the control command has been input to the port 9b via the input port 3b, the CPU 9 of the camera 50 confirms the ID number of the destination of transmission of the input control command. Since the ID number of the camera 50 is "01", it is determined that the control command is not for the camera 50, and the control command is transferred to the camera 60.

In the camera 60, when the control command is input to the port 9b via the input port 3b, the CPU 9 of the camera 60 confirms the ID number of the destination of transmission of the input control command. Since the ID number of the camera 60 is "02", it is determined that the control command is for the camera 60, and the camera 60 is controlled based on the control command. Upon completion of the camera control, an Ack command in which the ID number of the transmission destination (the ID number "00" of the host PC 40) and the ID number of the transmitter (the ID number "02" of the camera 60) are added is output from the output port 5a via the port 9a.

In the camera 70, when the Ack command has been input to the port 9a via the input port 3b, the CPU 9 of the camera 70 confirms the ID number of the destination of transmission of the input Ack command. Since the ID number of the camera 50 is "01", it is determined that the control command is not for the camera 50, and the Ack command is transferred to the camera 60. The host PC 40 receives the Ack command from the input port 4b, confirms that the control has been performed, and terminates the operation.

In the case of FIG. 6, command processing when a control command for the camera 60 is output from the host PC 40 has been described. The same processing may be executed by writing the ID number of the camera 50 or 70 in the ID number of the transmission destination in a control command and an Ack command.

Figure 7:
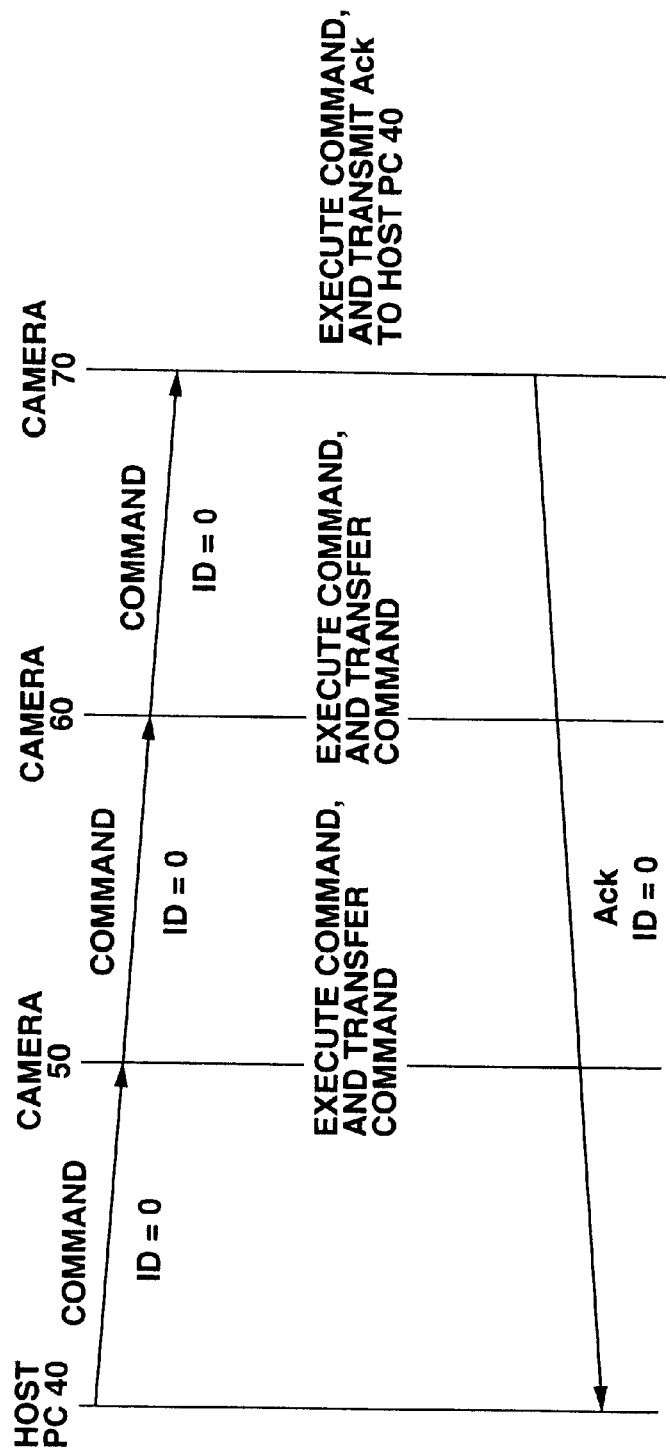

Next, a description will be provided of the operation process when outputting a control command by setting the ID number of the transmission destination's apparatus to "00", with reference to FIG. 7.

When the control command in which the ID number of the transmission destination's apparatus is set to "00" is output from the host PC 40, each of the cameras 50, 60 and 70 recognizes the ID number "00", and executes control based on the control command. Upon completion of execution of control of the camera 70 provided at the last stage of connection, an Ack command is output from the camera 70 to the host PC 40, and the process is terminated.

That is, when outputting a control command in which the ID number of the transmission destination's apparatus is set to "00", control based on the control command is executed in all connected electronic apparatuses.

Although in the above-described embodiment, the input/output terminals 3 and 5 and the CPU 9 are provided in each of the cameras 50, 60 and 70, the input/output terminals 3 and 5 and the CPU 9 may constitute a connection apparatus separate from the cameras 50, 60 and 70.

As described above, according to the foregoing embodiment, it is possible to control the serially connected cameras from the host PC 40, using a minimum necessary number of signal lines. For example, the objects of the present invention may be achieved by supplying a system or an apparatus with a program of software for realizing the functions of the above-described embodiment, and reading and executing program codes stored in a storage medium by means of a computer (or a CPU or an MPU (microprocessor unit)) of the system or the apparatus via a network, such as the Internet or the like. In such a case, the program codes themselves read from the storage medium realize the functions of the above-described embodiment, so that the storage medium storing the program codes constitutes the present invention. For example, a floppy disk, a hard disk, an optical disk, a magnetooptical disk, a CD(compact disc)-ROM (read-only memory), a CD-R (recordable), a magnetic tape, a nonvolatile memory card, a ROM or the like may be used as the storage medium for supplying the program codes.

The present invention may also be applied not only to a case in which the functions of the above-described embodiment are realized by executing program codes read by a computer, but also to a case in which an OS (operating system) or the like operating in a computer executes a part or the entirety of actual processing, and the functions of the above-described embodiment are realized by the processing.

The present invention may also be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing based on instructions of the program codes, and the functions of the above-described embodiment are realized by the processing.

When applying the above-described embodiment to the storage medium, program codes corresponding to the above-described flowcharts are stored in the storage medium. Briefly speaking, modules indispensable in the electronic apparatus connection system of the embodiment are stored in the storage medium.

As described above, according to the present invention, it is possible to integrally execute control of a plurality of serially connected electronic apparatuses using a minimum number of signal lines.

The individual components shown in outline or designated by blocks in the drawings are all well known in the electronic-apparatus communication method arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electronic apparatus, from among a plurality of serially connected electronic apparatuses, which can communicate a control command signal and first and second control signals, said electronic apparatus comprising:
- a first connection unit, having an input terminal for inputting the first control signal and an output terminal for outputting the second control signal, which is connected to an electronic apparatus from among the plurality of serially connected electronic apparatuses provided at a preceding stage of connection;
- a second connection unit, having an output terminal for outputting the first control signal and an input terminal for inputting the second control signal, which is connected to an electronic apparatus from among the plurality of serially connected electronic apparatuses provided at a succeeding stage of connection;
- a processing unit having a first input terminal connected to the input terminal of said first connection unit, a second input terminal connected to the input terminal of said second connection unit, and an output terminal connected to the output terminal of said second connection unit; and
- a change-over switch for switching a connection of the output terminal of said first connection unit to one of the output terminal of said processing unit and the input terminal of said second connection unit,
- wherein said processing unit provides the first control signal, outputs the provided first control signal from the output terminal of the processing unit, determines whether or not the second control signal has been input to the processing unit from the second input terminal of the processing unit in response to the output of the first control signal, and controls said change-over switch in accordance with the determination.

2. An electronic apparatus according to claim 1, wherein said processing unit newly provides the first control signal in accordance with input of the first control signal from the electronic apparatus provided at the immediately preceding stage of connection to the first input terminal.

3. An electronic apparatus according to claim 1, wherein, when starting said electronic apparatus, the first control signal is input from the electronic apparatus provided at the immediately preceding stage of connection.

4. An electronic apparatus according to claim 2, wherein said processing unit sets an ID number of said electronic apparatus based on an ID number of the first control signal input from the electronic apparatus provided at the immediately preceding stage of connection.

5. An electronic apparatus according to claim 4, wherein said processing unit sets a number obtained by adding one to the ID number of the first control signal input from the electronic apparatus provided at the immediately preceding stage of connection as an ID number of said electronic apparatus.

6. An electronic apparatus according to claim 4, wherein said processing unit provides the first control signal by setting the set ID number of said electronic apparatus as an ID number of a transmitter.

7. An electronic apparatus according to claim 1, wherein said processing unit controls said change-over switch so as to connect the output terminal of said first connection unit to the output terminal of said processing unit when the second control signal has not been input from the second input terminal within a predetermined time period, and connects the output terminal of said first connection unit to the input terminal of said second connection unit when the second control signal has been input.

* * * * *

UNITED STATES PATENT AND TRADEMARK OFFICE
CERTIFICATE OF CORRECTION

PATENT NO. : 6,834,321 B1
DATED : December 21, 2004
INVENTOR(S) : Toshihiko Yokoyama It is certified that error appears in the above-identified patent and that said Letters Patent is hereby corrected as shown below:

<u>Column 6,</u>
Line 16, "camera 60 by" should read -- camera 50 by --.

Signed and Sealed this

Fourteenth Day of February, 2006

JON W. DUDAS
*Director of the United States Patent and Trademark Office*